United States Patent
Powers et al.

(10) Patent No.: US 7,737,068 B2
(45) Date of Patent: Jun. 15, 2010

(54) CONVERSION OF FINE CATALYST INTO COKE-LIKE MATERIAL

(75) Inventors: Christopher A. Powers, Mandeville, LA (US); Donald H. Mohr, Orinda, CA (US); Bruce E. Reynolds, Martinez, CA (US); Jose Guitian Lopez, Madrid (ES)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 12/003,218

(22) Filed: Dec. 20, 2007

(65) Prior Publication Data

US 2009/0163352 A1 Jun. 25, 2009

(51) Int. Cl.
*B01J 38/02* (2006.01)
*B01J 38/72* (2006.01)

(52) U.S. Cl. .............................. 502/56; 502/21; 502/22; 423/53; 423/139; 423/150.1; 423/54; 423/594.17; 423/63; 423/67; 423/68

(58) Field of Classification Search ................... 502/21, 502/22, 56; 423/53, 139, 150.1, 54, 594.17, 423/63, 67, 68

See application file for complete search history.

(56) References Cited

U.S. PATENT DOCUMENTS

| | | |
|---|---|---|
| 2,487,867 A | 11/1949 | Griffin, Jr. |
| 2,515,062 A | 7/1950 | Smith |
| 2,774,742 A | 12/1956 | Stover et al. |
| 2,787,599 A | 4/1957 | Belden |
| 2,983,671 A * | 5/1961 | Fogle .......................... 208/127 |
| 3,072,560 A * | 1/1963 | Paterson et al. ................ 208/55 |
| 3,193,486 A * | 7/1965 | Payne .......................... 208/50 |
| 3,250,819 A | 5/1966 | Cabbage |
| 3,416,882 A * | 12/1968 | Whigham ..................... 423/63 |
| 3,429,805 A | 2/1969 | Karbosky |
| 3,567,433 A * | 3/1971 | Gutnikov ...................... 423/53 |
| 3,707,461 A * | 12/1972 | Gatsis et al. ............. 208/111.1 |
| 3,923,643 A | 12/1975 | Lewis et al. |
| 4,040,958 A | 8/1977 | Rammler |
| 4,049,765 A | 9/1977 | Yamazaki |
| 4,105,731 A | 8/1978 | Yamazaki |
| 4,120,698 A | 10/1978 | Atchinson et al. |
| 4,169,506 A | 10/1979 | Berry |
| 4,172,782 A | 10/1979 | Masuko et al. |
| 4,211,816 A | 7/1980 | Booker et al. |
| 4,224,135 A | 9/1980 | Gidaspow |
| 4,248,686 A | 2/1981 | Gidaspow |
| 4,277,731 A | 7/1981 | Pomgracz |
| 4,305,463 A | 12/1981 | Zakiewicz |
| 4,353,418 A | 10/1982 | Hoekstra et al. |
| 4,382,068 A | 5/1983 | Rokukawa |
| 4,395,315 A | 7/1983 | Zambrano |
| 4,407,707 A | 10/1983 | Merchant, Jr. et al. |
| 4,415,541 A | 11/1983 | Melin |
| 4,416,754 A | 11/1983 | Merchant, Jr. et al. |
| 4,436,636 A | 3/1984 | Carnicom |
| 4,482,766 A | 11/1984 | Stonner |
| 4,500,495 A * | 2/1985 | Hubred et al. ................. 423/53 |
| 4,514,368 A | 4/1985 | Hubred |
| 4,525,267 A * | 6/1985 | Inooka ......................... 208/58 |
| 4,544,479 A | 10/1985 | Yan |
| 4,579,637 A | 4/1986 | Jaisinghani et al. |
| 4,581,112 A | 4/1986 | Mintz |
| 4,584,140 A | 4/1986 | Blewett et al. |
| 4,622,118 A | 11/1986 | Chimenti |
| 4,636,317 A | 1/1987 | Lewis |
| 4,648,964 A | 3/1987 | Leto et al. |
| 4,655,927 A | 4/1987 | Ford |
| 4,657,745 A | 4/1987 | Hyatt |
| 4,661,265 A | 4/1987 | Olsen et al. |
| 4,662,669 A | 5/1987 | Erickson et al. |
| 4,666,685 A | 5/1987 | Wiewiorowski |
| 4,668,379 A | 5/1987 | Rosensweig et al. |
| 4,732,664 A | 3/1988 | Martini et al. |
| 4,769,127 A | 9/1988 | Erickson et al. |
| 4,790,941 A | 12/1988 | Taylor |
| 4,844,804 A | 7/1989 | Taylor |
| 4,846,976 A | 7/1989 | Ford |
| 4,850,498 A | 7/1989 | Taylor |
| 4,888,104 A | 12/1989 | de Aqudelo |
| 4,927,794 A | 5/1990 | Marcantonio et al. |
| 4,937,218 A | 6/1990 | de Aqudelo |
| 4,940,529 A | 7/1990 | Beaton et al. |
| 4,946,068 A | 8/1990 | Erickson et al. |
| 4,954,240 A | 9/1990 | Eidt, Jr. et al. |
| 4,990,241 A | 2/1991 | Buttke et al. |
| 5,006,264 A | 4/1991 | Acuna |
| 5,008,001 A * | 4/1991 | Kitamura et al. ............ 208/143 |

(Continued)

FOREIGN PATENT DOCUMENTS

WO WO 99/58732 11/1999

OTHER PUBLICATIONS

U.S. Appl. No. 12/004,015, inventors Shah, et al.

(Continued)

*Primary Examiner*—Elizabeth D Wood

(57) ABSTRACT

A process for recovering catalytic metals from fine catalyst slurried in heavy oil comprises pyrolizing fine catalyst slurried in heavy oil to provide one or more lighter oil products and a coke-like material and recovering catalytic metals from the coke-like material.

20 Claims, No Drawings

U.S. PATENT DOCUMENTS

| | | |
|---|---|---|
| 5,013,427 A | 5/1991 | Mosby |
| 5,013,533 A | 5/1991 | Howard et al. |
| 5,021,160 A | 6/1991 | Wolpert |
| 5,046,856 A | 9/1991 | McIntire |
| 5,053,118 A | 10/1991 | Houser |
| 5,059,331 A | 10/1991 | Goyal |
| 5,070,064 A | 12/1991 | Hsu et al. |
| 5,080,721 A | 1/1992 | Flanigan et al. |
| 5,124,025 A | 6/1992 | Kolstad et al. |
| 5,124,026 A | 6/1992 | Taylor et al. |
| 5,124,027 A | 6/1992 | Beaton et al. |
| 5,149,433 A | 9/1992 | Lien |
| 5,169,968 A | 12/1992 | Rice |
| 5,183,572 A | 2/1993 | Benn |
| 5,194,154 A | 3/1993 | Moyer et al. |
| 5,198,007 A | 3/1993 | Moyer |
| 5,209,840 A | 5/1993 | Sherwood, Jr. et al. |
| 5,228,978 A | 7/1993 | Taylor et al. |
| 5,230,791 A | 7/1993 | Sherwood, Jr. |
| 5,230,804 A | 7/1993 | Leupold et al. |
| 5,242,578 A | 9/1993 | Taylor et al. |
| 5,254,513 A | 10/1993 | Sherwood, Jr. et al. |
| 5,258,117 A | 11/1993 | Kolstad et al. |
| 5,269,934 A | 12/1993 | Dubrovsky et al. |
| 5,290,959 A | 3/1994 | Rice |
| 5,370,788 A | 12/1994 | Dai et al. |
| 5,372,722 A | 12/1994 | Schwering et al. |
| 5,445,728 A | 8/1995 | Sherwood, Jr. et al. |
| 5,474,668 A | 12/1995 | Ackerson et al. |
| 5,480,553 A | 1/1996 | Yamamori et al. |
| 5,484,755 A | 1/1996 | Lopez |
| 5,512,084 A | 4/1996 | Mauterer |
| 5,525,235 A | 6/1996 | Chen et al. |
| 5,527,473 A | 6/1996 | Ackerman |
| 5,599,463 A | 2/1997 | Hedrick |
| 5,620,588 A | 4/1997 | Ackerson et al. |
| 5,683,916 A | 11/1997 | Gaffe et al. |
| 5,698,101 A | 12/1997 | Kopp et al. |
| 5,750,026 A | 5/1998 | Gadkaree et al. |
| 5,770,078 A | 6/1998 | Hedrick |
| 5,845,993 A | 12/1998 | Shirtum et al. |
| 5,853,564 A | 12/1998 | Ackerson et al. |
| 5,885,422 A | 3/1999 | Kurukchi et al. |
| 5,900,159 A | 5/1999 | Engel et al. |
| 5,916,440 A | 6/1999 | Garcera et al. |
| 5,922,201 A | 7/1999 | Yamamori et al. |
| 5,944,998 A | 8/1999 | Rolchigo et al. |
| 6,017,022 A | 1/2000 | Shirtum |
| 6,024,862 A | 2/2000 | Ackerson et al. |
| 6,036,865 A | 3/2000 | Miller et al. |
| 6,045,703 A | 4/2000 | Miller |
| 6,068,760 A | 5/2000 | Benham et al. |
| 6,110,390 A | 8/2000 | Potter et al. |
| 6,129,839 A | 10/2000 | Maing, Jr. |
| 6,180,072 B1 | 1/2001 | Veal et al. |
| 6,224,765 B1 | 5/2001 | Watanabe et al. |
| 6,281,405 B1 | 8/2001 | Davis et al. |
| 6,375,843 B1 | 4/2002 | Potter et al. |
| 6,380,452 B1 | 4/2002 | Davis et al. |
| 6,390,304 B1 | 5/2002 | Wilson et al. |
| 6,454,932 B1 | 9/2002 | Baldassari et al. |
| 6,491,822 B2 | 12/2002 | Alper |
| 6,517,725 B2 | 2/2003 | Spearman et al. |
| 6,518,441 B2 | 2/2003 | Grosch et al. |
| 6,548,197 B1 | 4/2003 | Chandran et al. |
| 6,656,342 B2 | 12/2003 | Smith et al. |
| 6,683,783 B1 | 1/2004 | Smalley et al. |
| 6,726,832 B1 | 4/2004 | Baldassari et al. |
| 6,762,209 B1 | 7/2004 | Neathery et al. |
| 6,764,598 B2 | 7/2004 | Yu et al. |
| 6,790,934 B2 | 9/2004 | Johnson et al. |
| 6,841,062 B2 | 1/2005 | Reynolds |
| 6,887,390 B2 | 5/2005 | Mohedas et al. |
| 7,214,309 B2 | 5/2007 | Chen et al. |
| 2002/0190005 A1 | 12/2002 | Branning |
| 2005/0067194 A1 | 3/2005 | Pena et al. |
| 2006/0054534 A1 | 3/2006 | Chen et al. |
| 2006/0054535 A1 | 3/2006 | Chen et al. |
| 2006/0058174 A1 | 3/2006 | Chen et al. |
| 2006/0058175 A1 | 3/2006 | Chen et al. |
| 2006/0135631 A1 | 6/2006 | Kopponen et al. |
| 2007/0025899 A1 | 2/2007 | Marcantonio |
| 2007/0138055 A1 | 6/2007 | Farshid et al. |
| 2007/0138057 A1 | 6/2007 | Farshid et al. |

OTHER PUBLICATIONS

U.S. Appl. No. 12/004,014, inventors Da Costa, et al.
U.S. Appl. No. 12/004,028, inventor Chen.
U.S. Appl. No. 12/004,032, inventors Lopez et al.

* cited by examiner

CONVERSION OF FINE CATALYST INTO COKE-LIKE MATERIAL

BACKGROUND

Traditional light oil reserves are being depleted due to high oil production. Oil fields are requiring substantial new investment in secondary and tertiary oil recovery technology. On the other hand, the cost of producing and refining heavy crude has decreased due to new production and refining technologies. Most of the heavy crude reserves all over the world have not yet been exploited. Considering the continuously increasing demand in oil and the large difference in price between light oil and heavy crude, heavy crude reserves are emerging as a very attractive source of energy.

Heavy crude contains 40-70% high boiling range material that boils over 1000° F. (i.e., vacuum resid) and very low amounts of fuels in high demand such as, for example, gasoline and diesel. Therefore, in order to convert vacuum resid to valuable light products, new and more cost effective technologies are needed. Heavy crude can be converted into lighter products via conventional processes such as coking (e.g., delayed coking and/or fluid coking) and hydroconversion (e.g., LC Fining and H-OIL). However, such conventional processes produce large amounts of undesirable byproducts such as, for example, coke or fuel oil and also are very sensitive to the contaminants such as, for example, V, Ni, and S.

Most hydroconversion technologies utilize novel catalysts composed predominantly of metals of Group VA, VIA, VIIA, or VIII metal sulfides especially compounds such as molybdenum disulfide ($MoS_2$) and nickel sulfide (NiS). Such metals are highly active in hydroconversion of heavy crudes but also are very expensive. In order to minimize the amount of catalyst required, and minimize the diffusion effects, catalyst is often unsupported.

In hydroconversion of vacuum resid and related feedstocks, the remaining portion of unconverted material, which may range from 0 to 10% of fresh feed, shows low API gravity (−10 to 29), high remaining microcarbon residue (MCR) (0 to 60%), very high viscosity and asphaltenes content, and likely also contains catalyst. Therefore, the separation scheme utilized to recover valuable active metals such as, for example, $MoS_2$ and NiS is a critical step in making the process economically attractive. Catalyst remaining in the unconverted slurry bleed oil (USBO) is to be removed and sent for reprocessing to recover the metals and also to recover the unconverted portion of the residue in order to be recycled or further processed.

Expensive spent catalyst contained in the USBO is coated with USBO and is not leachable by conventional technologies of metals extraction that basically are effective for water-based slurries. Therefore, without additional processing, the valuable metals cannot be recovered. Technologies employing microfiltration, ultrafiltration, or nanofiltration; gravity based separation, such as centrifugation or hydrocycloning; and chemical recovery, which may be effective for water-based slurries, similarly do not provide acceptable results for catalyst coated with USBO.

SUMMARY

Provided is a process for recovering catalytic metals from fine catalyst slurried in heavy oil. The process comprises pyrolizing fine catalyst slurried in heavy oil to provide one or more lighter oil products and a coke-like material. Catalytic metals are recovered from the coke-like material.

DETAILED DESCRIPTION

As used herein, "heavy oil" refers to an oil characterized by low hydrogen to carbon ratios and high carbon residues, asphaltenes, nitrogen, sulfur and metal contents. Examples include atmospheric gas oils, vacuum gas oils, deasphalted oils, olefins, oils derived from tar sands or bitumen, oils derived from coal, heavy crude oils, synthetic oils from Fischer-Tropsch processes, and oils derived from recycled oil wastes and polymers. The heavy oil can comprise microcarbon residue (MCR) in the range of about 15 to 30 weight % and ($C_7$) asphaltenes in the range of about 5 to 20 weight %.

The presently claimed process for recovering catalytic metals from fine catalyst slurried in heavy oil comprises pyrolizing fine catalyst slurried in heavy oil to provide one or more lighter oil products and a coke-like material and recovering catalytic metals from the coke-like material.

Heavy Oil Upgrading

Suitable feeds to a process for upgrading heavy oils using a slurry catalyst composition, include, for example, atmospheric residuum, vacuum residuum, tar from a solvent deasphlating unit, atmospheric gas oils, vacuum gas oils, deasphalted oils, olefins, oils derived from tar sands or bitumen, oils derived from coal, heavy crude oils, synthetic oils from Fischer-Tropsch processes, and oils derived from recycled oil wastes and polymers. The feed is supplied to a reactor, wherein the feed is reacted with a catalyst slurry described in further detail below and preferably hydrogen. In an embodiment, the reactor is a liquid recirculating reactor, although other types of upflow reactors may be employed. The catalyst slurry can be useful for, but not limited to, hydrogenation upgrading processes such as thermal hydrocracking, hydrotreating, hydrodesulphurization, hydrodenitrification, and hydrodemetalization. Effluent streams from the reactor, perhaps following downstream processing, such as, for example, separation(s), can include one or more valuable light products as well as a stream containing unsupported catalyst in unconverted feed.

Processing of an effluent steam containing unsupported catalyst in unconverted feed is described herein. In particular, the cost of the catalyst, and more specifically the expensive metal(s) that comprise the catalyst, may necessitate the recovery of catalyst from unconverted feed to ensure an economical heavy oil upgrading process. Additionally, the recovery of catalyst from unconverted feed may allow for 90-100% conversion of heavy oil, as described in further detail, below. However, the high molecular weight of the unconverted heavy oil feed makes it difficult to separate unsupported catalyst therefrom. Further, conventional filtration processes may not be suitable to separate catalyst from unconverted feed, as the unsupported fine catalyst may cause plugging or fouling of filters.

Catalyst Slurry

The presently described method utilizes catalysts in the conversion (in particular, hydroconversion) of heavy oil (i.e., reaction of a slurry comprising unsupported fine catalyst in heavy oil) into one or more light oil products. In an embodiment, the catalysts are composed predominantly of compounds such as a Group VI and/or Group VIII metal compound sulfide, for example, molybdenum sulfide ($MoS_2$) and nickel sulfide (NiS), as described in U.S. Pat. No. 5,484,755 and U.S. Patent Application Publication Nos. 2006/0054534 A1, 2006/0054535 A1, 2006/0058174 A1, and 2006/0058175 A1, the contents of which are hereby incorporated by reference in their entireties. The highly active, unsupported catalysts typically exhibit particle size distributions in the range of about 1-8 microns, with some smaller and larger particles existing on either end of the range. In particular, the catalyst particles can have a size distribution in the range of about 0.2-20 microns, and a mean particle size of about 4-5 micron, with the mode being about 6-7 micron.

In particular, the feedstock to the deep catalyst cracking can be the catalyst bleed stream from a vacuum resid unit, which is primarily made-up of spent finely divided unsupported slurry catalyst, carbon fines, and metal fines in unconverted resid hydrocarbon oil. The solids content of the feedstock can be in the range of about 5-40 weight %, for example about 15-30 weight % or about 20-25 weight %.

Coking

When the MCR or asphaltenes in the heavy oil are exposed to extreme temperatures, ranging from 700 to 1000+° F., the petroleum molecules are "thermally cracked" in such a way as to produce some portion of lighter oil product and some portion of condensed asphaltenes and heavy molecules as petroleum coke. The coke-like matrix preferably is leachable, such that valuable metals (e.g., Mo, Ni, and V) can be recovered therefrom.

The coking unit can be, for example, a standard delayed coking unit, a modified delayed coking unit, a screw reactor type of pyrolyzer, a screw coker, a rotary kiln, or a rotary calciner. In the coking reaction, cracked liquid and gas products as well as coke are produced. The coke contains slurry catalyst.

A large amount of coke deposited onto the catalyst can block access to the nickel and molybdenum that are desired to be leached. The amount of coke generated in the coking step can be many times (e.g., about 3 to about 6 times) greater than the amount of coke present on the used catalyst as it exits heavy oil upgrading. Nevertheless, according to the present process the coke deposited in the coking step does not encapsulate the metals.

Grinding

Thus, prior to metals recovery, the coke-like material can be ground, and the ground particles retain enough porosity to be leachable. For example, the coke-like material can be ground to a particle size ranging from about greater than 1 to less than 50 microns.

Metals Recovery

The process of recovering metals, specifically molybdenum, nickel, and deposited vanadium, from coked, ground catalyst comprises the steps of autoclave-based ammoniacal metals leach, vanadium metal recovery, nickel metal solvent extraction, and molybdenum metal solvent extraction. Coked ground catalyst, containing $MOS_2$ and slurried in water, enters an autoclave, along with ammonia and enriched air containing additional oxygen. Leaching reactions occur in the autoclave, producing ammonium molybdate and nickel ammonium sulfate, which remain in solution and pass to a leach residue filter press. The ammonium metavanadate precipitates out as a solid in the leach slurry. Solid/liquid separation occurs in the leach residue filter press.

More specifically, a stream of coked, ground catalyst slurried with water is pumped to an ammoniacal pressure leaching autoclave. This autoclave is a multi-chambered, agitated vessel, in which both ammonia and oxygen are supplied to induce leaching reactions. These reactions can occur at various temperatures, for example, in the range from about 20° C. through about 315° C., in the range from about 35° C. through about 250° C., or in the range from about 90° C. through about 200° C. Autoclave vessel pressure ranges can be, for example, in the range from about 0 psig through about 1200 psig, in the range from about 100 psig through about 900 psig, or in the range from about 300 psig through about 700 psig, sufficient to suppress flashing in the vessel. Process pH values range from about 7 through about 12, for example, from about 8 through about 11 or from about 9 through about 10. Leaching reactions occur as specified in the equations below.

$$MoS_2 + 4.5O_2 + 6NH_3 + 3H_2O \rightarrow (NH_4)_2MoO_4 + 2(NH_4)_2SO_4$$

$$V_2S_3 + 7O_2 + 8NH_3 + 4H_2O \rightarrow 2NH_4VO_3 + 3(NH_4)_2SO_4$$

$$NiS + 2O_2 + 6NH_3 \rightarrow Ni(NH_3)_6SO_4$$

Further details of metals recovery, for example, vanadium extraction, nickel extraction, and molybdenum removal, can be found in U.S. Patent Application Publication No. 2007/0025899, the contents of which are hereby incorporated by reference in its entirety.

The following examples are intended to be illustrative and are not meant to be limiting in any way.

EXAMPLE

Vacuum residue containing spent catalyst was processed in a microcoker unit and exposed to coking conditions fro 850 to 950° F. Products from the microcoker unit included a cracked gas stream, a coker liquid product stream, and a solid coke product. The coker liquid product stream was analyzed for metals, specifically molybdenum, nickel, and vanadium. None were found. The solid coke product was similarly analyzed, and it was determined that the solid coke product contained appreciable quantities of molybdenum, nickel, and vanadium. The solid coke product was milled to 100% passing 325 mesh (44 μm) in a ceramic ball mill, and the milled sample was then was subjected to pressure leach testing under conditions taught in U.S. Patent Application Publication No. 2007/0025899 A1, the contents of which are hereby incorporated by reference in its entirety. Extraction of molybdenum was reported at 99.4%, extraction of nickel was reported at 86.3%, and extraction of vanadium was reported at 68.9%.

Many modifications of the exemplary embodiments disclosed herein will readily occur to those of skill in the art. Accordingly, the present disclosure is to be construed as including all structure and methods that fall within the scope of the appended claims.

The invention claimed is:

1. A process for recovering metals from spent fine catalyst slurried in heavy oil, the process comprising:
   pyrolizing the spent fine catalyst slurried in heavy oil by thermal cracking to provide one or more lighter oil products and a coke-like material comprising metals; and
   recovering metals from the coke-like material,
   wherein the spent fine catalyst slurried in heavy oil comprises a Group VI metal sulfide and/or a Group VIII metal sulfide.

2. The process of claim 1, wherein pyrolizing is conducted in a reactor selected from the group consisting of standard delayed coking unit, a modified delayed coking unit, a screw reactor type of pyrolyzer, a screw coker, a rotary kiln, and a rotary calciner.

3. The process of claim 1, wherein pyrolizing comprises heating to a temperature of greater than 700° F.

4. The process of claim 1, wherein pyrolizing comprises heating for greater than 0.5 hours.

5. The process of claim 1, wherein the coke-like material has sufficient porosity to allow leaching of metals in the fine catalyst.

6. The process of claim 1, wherein the fine catalyst is partially or completely spent.

7. The process of claim 1, wherein the fine catalyst comprises particles having a size of less than 10 microns.

8. The process of claim 1, further comprising grinding the coke-like material.

9. The process of claim 1, further comprising grinding the coke-like material to a particle size ranging from about greater than 1 to less than 50 microns.

10. The process of claim 1, further comprising slurrying the coke-like material with water.

11. The process of claim 1, wherein recovering metals from the coke-like material comprises subjecting the coke-like material to leaching reactions.

12. The process of claim 11, wherein the leaching reactions occur in an autoclave, wherein the coke-line material comprises molybdenum, nick, and vanadium.

13. The process of claim 12, wherein ammonia and oxygen are supplied to an ammoniacal pressure leaching autoclave to induce leaching reactions.

14. The process of claim 12, wherein the leaching reactions produce ammonium molybdate and nickel ammonium sulfate.

15. The process of claim 13, further comprising filtering ammonium molybdate as a solid in a leach slurry from nickel ammonium sulfate in a solution.

16. The process of claim 1, wherein the fine catalyst slurried in heavy oil comprises particles having a mean particle size of about 4-5 micron.

17. The process of claim 1, wherein the fine catalyst slurried in heavy oil is from a catalyst bleed stream from a vacuum resid unit.

18. The process of claim 17, wherein the catalyst bleed stream comprises unsupported slurry catalyst, carbon fines, and metal finds in unconverted resid hydrocarbon oil.

19. The process of claim 18, wherein the catalyst bleed stream comprises 5-40 wt. % solids.

20. The process of claim 19, wherein the catalyst bleed stream comprises 15-30 wt. % solids.

* * * * *